(12) United States Patent
Yang et al.

(10) Patent No.: US 9,962,920 B2
(45) Date of Patent: May 8, 2018

(54) SEPARATION DEVICE FOR BACKLIGHT SOURCE

(71) Applicants: BOE TECHNOLOGY GROUP CO., LTD., Beijing (CN); BEIJING BOE DISPLAY TECHNOLOGY CO., LTD., Beijing (CN)

(72) Inventors: Chunyu Yang, Beijing (CN); Man Yuan, Beijing (CN); Ji Zhang, Beijing (CN); Wei Zhang, Beijing (CN); Yongzhi Yin, Beijing (CN); Yanhong Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/285,655

(22) Filed: Oct. 5, 2016

(65) Prior Publication Data

US 2017/0113448 A1  Apr. 27, 2017

(30) Foreign Application Priority Data

Oct. 21, 2015  (CN) .......................... 2015 1 0688597

(51) Int. Cl.
| | |
|---|---|
| *B32B 38/10* | (2006.01) |
| *B32B 43/00* | (2006.01) |
| *B32B 38/18* | (2006.01) |

(52) U.S. Cl.
CPC ........ *B32B 43/006* (2013.01); *B32B 38/1833* (2013.01); *B32B 38/1858* (2013.01);
(Continued)

(58) Field of Classification Search
CPC . B32B 38/10; B32B 43/006; Y10T 156/1132; Y10T 156/1158; Y10T 156/1911; Y10T 156/1944
(Continued)

(56) References Cited

U.S. PATENT DOCUMENTS 4,770,590 A * 9/1988 Hugues ............. H01L 21/67259
198/395
4,775,281 A * 10/1988 Prentakis ............... B23Q 7/048
118/500
(Continued)

*Primary Examiner* — Mark A Osele
*Assistant Examiner* — Nickolas Harm
(74) *Attorney, Agent, or Firm* — Brooks Kushman P.C.

(57) ABSTRACT

A separation device for a backlight source is provided. The separation device includes a machine table, at least one separation platform, where each separation platform is located above the machine table and secured at a fixed position relative to the machine table and is configured to support a display module and secure a backlight source of the display module thereon; a plurality of guide columns arranged perpendicular to the machine table, at least one adsorption mechanism arranged in a one-to-one correspondence with the at least one separation platform, where each adsorption mechanism is arranged at a side of the corresponding separation platform away from the machine table and configured to adsorb a display screen of the display module on the corresponding separation platform, and a driving unit configured to drive each adsorption mechanism to move in the lengthwise direction of the plurality of guide columns.

17 Claims, 3 Drawing Sheets

(52) U.S. Cl.
CPC ........... *B32B 38/10* (2013.01); *B32B 2457/20* (2013.01); *Y10T 156/1132* (2015.01); *Y10T 156/1158* (2015.01); *Y10T 156/1911* (2015.01); *Y10T 156/1944* (2015.01)

(58) Field of Classification Search
USPC .................. 156/707, 711, 752, 758, 924
See application file for complete search history.

(56) References Cited

U.S. PATENT DOCUMENTS

| | | | | |
|---|---|---|---|---|
| 4,775,290 | A * | 10/1988 | Brown | H05K 13/0061 294/65 |
| 5,275,521 | A * | 1/1994 | Wada | H01L 21/67309 414/331.14 |
| 5,407,519 | A * | 4/1995 | Joffe | B29C 43/56 156/358 |
| 5,447,596 | A * | 9/1995 | Hayase | H01L 21/6835 156/701 |
| 5,545,283 | A * | 8/1996 | Collins | H01L 21/67144 156/285 |
| 6,074,163 | A * | 6/2000 | Yamazaki | B65G 49/06 271/97 |
| 6,649,017 | B1 * | 11/2003 | Kurokawa | H01L 21/67092 156/711 |
| 6,935,466 | B2 * | 8/2005 | Lubomirsky | H01L 21/68742 118/724 |
| 7,207,763 | B2 * | 4/2007 | Lee | H01L 21/67303 156/345.3 |
| 7,367,601 | B2 * | 5/2008 | Ogimoto | B65G 49/061 29/743 |
| 2005/0150597 | A1 * | 7/2005 | Henley | B28D 5/00 156/755 |
| 2007/0292248 | A1 * | 12/2007 | Thallner | H01L 21/67092 414/403 |
| 2007/0296035 | A1 * | 12/2007 | George | H01L 21/187 257/347 |
| 2009/0114348 | A1 * | 5/2009 | Hwang | B32B 37/0046 156/536 |
| 2009/0305617 | A1 * | 12/2009 | Nakamura | H01L 21/6838 451/364 |
| 2011/0048630 | A1 * | 3/2011 | Hase | H01L 21/67132 156/272.2 |
| 2011/0198040 | A1 * | 8/2011 | Ebata | B65H 41/00 156/750 |
| 2013/0000684 | A1 * | 1/2013 | Soma | H01L 21/67051 134/36 |
| 2013/0048222 | A1 * | 2/2013 | Tanaka | H01L 21/67092 156/707 |
| 2013/0292062 | A1 * | 11/2013 | Iwashita | H01L 21/67092 156/750 |
| 2014/0020846 | A1 * | 1/2014 | Hirakawa | H01L 21/67092 156/711 |
| 2014/0020847 | A1 * | 1/2014 | Burggraf | H01L 21/67092 156/714 |
| 2014/0061989 | A1 * | 3/2014 | Zhang | G02F 1/1303 269/37 |
| 2014/0150981 | A1 * | 6/2014 | Itou | B32B 38/1858 156/714 |
| 2014/0335633 | A1 * | 11/2014 | Okada | H01L 21/67092 438/7 |
| 2015/0059987 | A1 * | 3/2015 | Kumakura | B32B 43/006 156/714 |
| 2015/0217557 | A1 * | 8/2015 | Lee | B32B 43/006 156/707 |
| 2016/0214367 | A1 * | 7/2016 | Choi | B32B 43/006 |

* cited by examiner

SEPARATION DEVICE FOR BACKLIGHT SOURCE

CROSS-REFERENCE TO RELATED APPLICATIONS

This application claims priority to Chinese patent application No. 201510688597.8 filed on Oct. 21, 2015, which is incorporated herein by reference in its entirety.

TECHNICAL FIELD

The present disclosure relates to the manufacture of display devices, in particular to a separation device for a backlight source.

BACKGROUND

During the manufacture of a display device, for a display module desired to be maintained, it is required to separate a backlight source from a display screen.

A separation device for a backlight source in related technology mainly includes a separation platform onto which the backlight source of the display module is secured, and a suction cap configured to adsorb the display screen of the display module. During the separation, the display module is placed onto the separation platform in such a manner that the backlight source is secured onto the separation platform with the display screen away from the separation platform. At this time, the display module is heated by a heating device inside the separation platform, and the display screen is adsorbed via the suction cup held by an operator. The suction cup may be moved by the operator, so as to separate the display screen from the backlight source.

As mentioned above, the display screen is separated from the backlight source manually, and during the separation, it is difficult to control a force for moving the suction cup as well as a movement angle. As a result, the display screen may be damaged locally due to an uneven force applied thereto, and a display effect of the display screen may be adversely affected. In addition, it is inconvenient to perform the separation manually.

SUMMARY

The present disclosure provides a separation device for a backlight source, which can prevent a display screen from being damaged and improve the separation efficiency.

The present disclosure provides, in some embodiments, a separation device for a backlight source, including a machine table; at least one separation platform, where each separation platform is located above the machine table and secured at a fixed position relative to the machine table, each separation platform is configured to support a display module and secure a backlight source of the display module thereon; a plurality of guide columns arranged perpendicular to the machine table; at least one adsorption mechanism arranged in a one-to-one correspondence with the at least one separation platform, where each adsorption mechanism is arranged at a side of the corresponding separation platform away from the machine table and is configured to adsorb a display screen of the display module on the corresponding separation platform, an adsorption surface of each adsorption mechanism is parallel to a support surface of the corresponding separation platform, and each adsorption mechanism is movable in a lengthwise direction of the plurality of guide columns to adjust a distance from the adsorption surface of the adsorption mechanism to the support surface of the corresponding separation platform; and a driving unit configured to drive each adsorption mechanism to move in the lengthwise direction of the plurality of guide columns.

In using the separation device for the backlight source provided in the present disclosure, the display module is placed onto the separation platform, with the display screen arranged away from the separation platform and the backlight source secured onto the separation platform. The display screen is adsorbed by the corresponding adsorption mechanism arranged above the separation platform. The adsorption mechanism is driven by the driving unit to move in the lengthwise direction of the guide columns, so as to gradually increase the distance from the support surface of the separation platform to the adsorption surface of the adsorption mechanism, thereby separating the display screen from the backlight source due to an external force applied by the driving unit. Hence, the separation device in the embodiments of the present disclosure may be used to separate the display screen from the backlight source automatically rather than manually. In addition, an even force may be applied to the display screen in a relatively fixed direction to separate the display screen from the backlight source. As a result, with the separation device in the embodiments of the present disclosure, the display screen may be prevented from being damaged and the separation efficiency is enhanced.

Optionally, there are a plurality of separation platforms and a plurality of adsorption mechanisms, the plurality of separation platforms is spaced from each other in the lengthwise direction of the plurality of guide columns, the plurality of separation platforms and the plurality of adsorption mechanism are arranged alternately, and any two adjacent adsorption mechanisms are fixedly connected to each other via connection columns. According to the separation device in the embodiments of the present disclosure, it is able to simultaneously separate the backlight sources of a plurality of display modules from the corresponding display screens, so as to improve the separation efficiency and reduce the power consumption. In addition, the adjacent adsorption mechanisms are fixedly connected to each other via the connection column, such that all the adsorption mechanisms can move simultaneously when the driving unit drives one adsorption mechanism to move, so as to simplify the structure and reduce the quantity of the driving units, thereby further reducing the power consumption.

Optionally, the driving unit includes at least two screw rods arranged perpendicular to the machine table and a motor configured to drive the at least two screw rods to rotate, and each adsorption mechanism is in threaded connection with the at least two screw rods. According to the embodiments of the present disclosure, the motor may drive the screw rods to rotate, thereby driving each adsorption mechanism to move in the lengthwise direction of the guide columns. If more than one motor is used, these motors need to have an identical output speed, so as to drive the screw rods to rotate synchronously, thereby maintaining the adsorption surface of each adsorption mechanism to be parallel to the support surface of the corresponding separation platform all the time.

Optionally, the separation device for the backlight source further includes a programmable controller configured to control an output speed of the motor.

Optionally, the driving unit includes at least one telescopic cylinder, a cylinder block of each telescopic cylinder is secured at a fixed position relative to the machine table, and one end of a telescopic rod of each telescopic cylinder is fixedly connected to one of the adsorption mechanisms. The telescopic movement of the telescopic cylinder drives the adsorption mechanism to move. Of course, the cylinder block of the telescopic cylinder may be secured onto the machine table, and one end of the telescopic rod may be fixedly connected to the adsorption mechanism closest to the machine table so as to push the adsorption mechanism from the bottom up. In addition, the cylinder block of the telescopic cylinder may be secured above the adsorption mechanism farthest from the machine table and one end of the telescopic rod may be fixedly connected to this adsorption mechanism, so as to pull the adsorption mechanism from the bottom up.

Optionally, each telescopic cylinder is an air cylinder or oil cylinder.

Optionally, inside each separation platform is provided with a heating unit configured to heat the display module placed on the each separation platform, so as to reduce an adhesion force between the backlight source and the display screen, thereby facilitating the separation of the backlight source from the display screen.

Optionally, each adsorption mechanism includes a frame in which a plurality of guide holes is arranged in a one-to-one correspondence with the plurality of guide columns; and a support plate arranged at a side of the frame facing the machine table and provided with a plurality of vacuum suction cups and a vacuum pipeline in communication with the plurality of vacuum suction cups.

Optionally, each separation platform is provided with a T-shaped slot for securing the backlight source. The T-shaped slot is engaged with a lug of the backlight source, so as to secure the backlight source. Of course, the separation platform may also be provided with any other structures for securing the backlight source, e.g., a vacuum adsorption disc, and those other structures are not enumerated herein.

Optionally, the separation device for the backlight source further includes a housing configured to at least receive each separation platform, the plurality of guide columns and each adsorption mechanism. Through the housing, it is able to prevent pollution by foreign matters when separating the backlight source from the display screen and improve the separation efficiency.

Optionally, in the case that there is a plurality of separation platforms, the plurality of separation platforms is arranged parallel to each other and parallel to the machine table.

Optionally, each guide column is inserted into the corresponding guide hole, and a sliding bearing is arranged between the guide hole and the guide column so as to slidably move the guide column relative to the guide hole.

Figure 1:
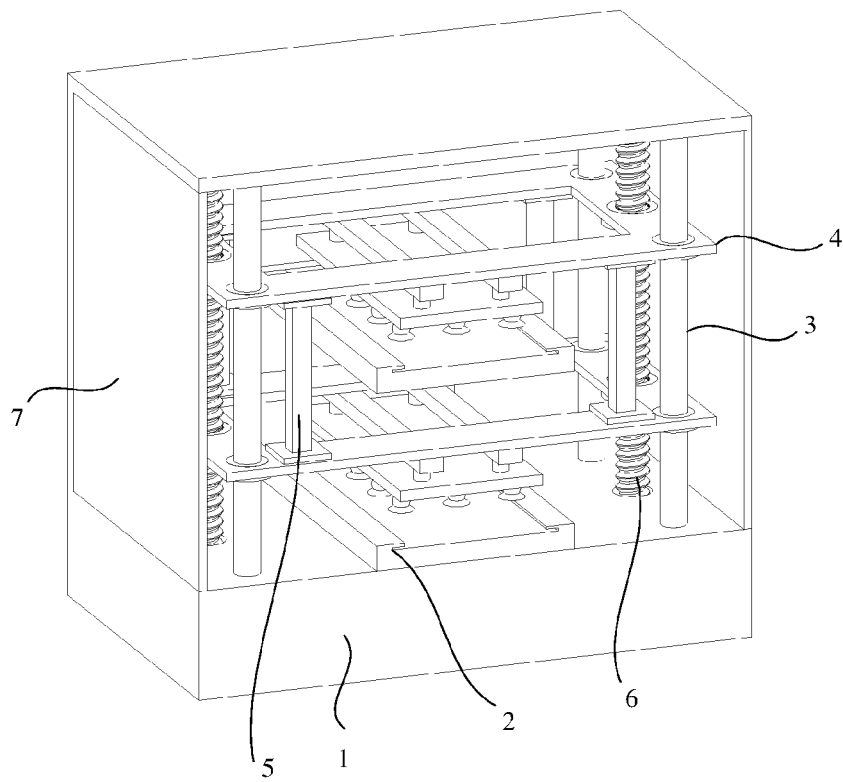
FIG. 1 is a schematic view showing a separation device for a backlight source according to some embodiments of the present disclosure.

REFERENCE SIGN LIST 1 machine table
2 separation platform
21 T-shaped slot
3 guide column
4 adsorption mechanism
41 frame
42 guide hole
43 support plate
44 vacuum suction cup
45 vacuum pipeline
5 connection column
6 screw rod
7 housing

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Technical solutions of the present disclosure are described hereinafter in a clear and complete manner in conjunction with the drawings and embodiments. Obviously, the following embodiments merely relate to a part of, rather than all of, the embodiments of the present disclosure, and other embodiments obtained by a person skilled in the art may based on these embodiments without paying creative efforts also fall within the scope of the present disclosure.

As shown in FIG. 1, which is a schematic view showing a separation device for a backlight source according to some embodiments of the present disclosure, the separation device includes a machine table 1; at least one separation platform 2, each separation platform 2 being located above the machine table 1 and secured at a fixed position relative to the machine table 1, each separation platform 2 being configured to support a display module and secure a backlight source of the display module thereon; a plurality of guide columns 3 arranged perpendicular to the machine table 1; at least one adsorption mechanism 4 arranged in a one-to-one correspondence with the at least one separation platform 2, each adsorption mechanism 4 being arranged at a side of the corresponding separation platform 2 away from the machine table 1 and configured to adsorb a display screen of the display module on the corresponding separation platform 2, an adsorption surface of each adsorption mechanism 4 being parallel to a support surface of the corresponding separation platform 2, each adsorption mechanism 4 being capable of moving in a lengthwise direction of the plurality of guide columns 3 so as to adjust a distance from the adsorption surface of the adsorption mechanism 4 to the support surface of the corresponding separation platform 2; and a driving unit configured to drive each adsorption mechanism 4 to move in the lengthwise direction of the plurality of guide columns 3.

It should be appreciated that, although two separation platforms 2 and two adsorption mechanisms 4 are shown in FIG. 1, during actual application, the separation device may merely include one separation platform 2 and one adsorption mechanism 4, or may include three or more separation platforms 2 and three or more adsorption mechanisms 4, as long as the quantity of the separation platform(s) is identical to the quantity of the adsorption mechanism(s).

In using the separation device for the backlight source provided in the present disclosure, the display module is placed onto the separation platform 2, with the display screen arranged away from the separation platform 2 and the backlight source secured onto the separation platform 2. The display screen is adsorbed by the corresponding adsorption mechanism 4 arranged above the separation platform 2. The adsorption mechanism 4 is driven by the driving unit to move in the lengthwise direction of the guide columns 3, so as to gradually increase the distance from the support surface of the separation platform 2 to the adsorption surface of the adsorption mechanism 4, thereby separating the display screen from the backlight source due to an external force applied by the driving unit. Hence, the separation device in the embodiments of the present disclosure may be used to separate the display screen from the backlight source automatically rather than manually. In addition, an even force may be applied to the display screen in a relatively fixed direction to separate the display screen from the backlight source. As a result, with the separation device in the embodiments of the present disclosure, the display screen may be prevented from being damaged and the separation efficiency is enhanced.

Figure 2:
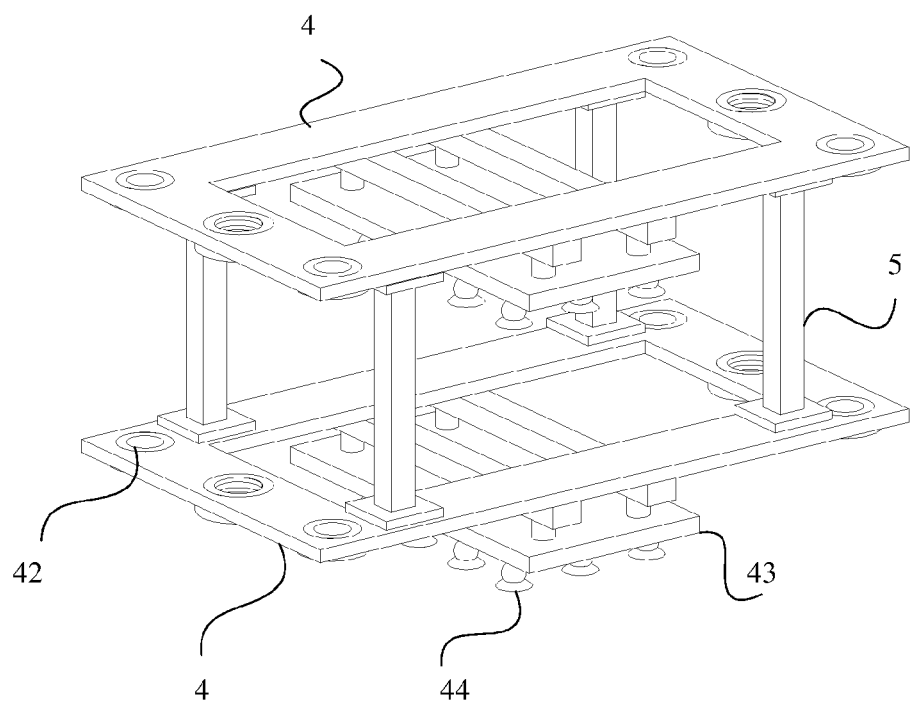
FIG. 2 is a schematic view showing the combination of a plurality of adsorption mechanisms according to some embodiments of the present disclosure.
Figure 4:
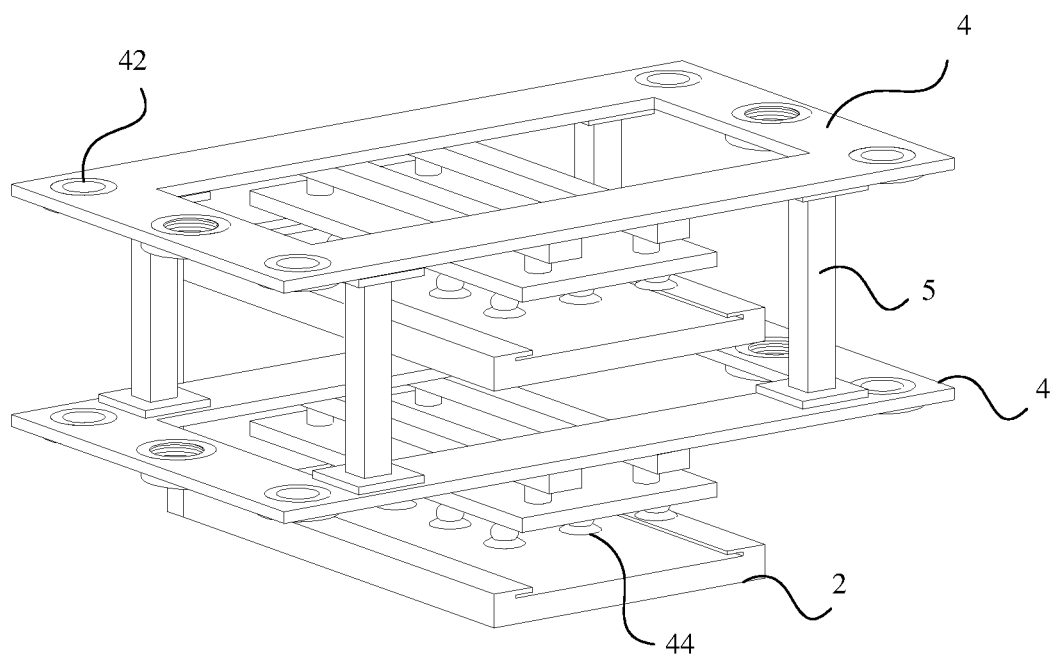
FIG. 4 is a schematic view showing the combination of an adsorption mechanism with a separation platform according to some embodiments of the present disclosure.

FIG. 2 is a schematic view showing the combination of a plurality of adsorption mechanisms according to some embodiments of the present disclosure, and FIG. 4 is a schematic view showing the combination of a plurality of adsorption mechanisms with a plurality of separation platforms according to some embodiments of the present disclosure. As shown in FIG. 4, the plurality of separation platforms 2 is spaced from each other in the lengthwise direction of the plurality of guide columns 3, each adsorption mechanism 4 is arranged above the corresponding separation platform 2, the plurality of separation platforms 2 and the plurality of adsorption mechanisms 4 are arranged alternately, and any two adjacent adsorption mechanisms 4 are fixedly connected to each other via connection columns 5. With the separation device for the backlight source provided with the plurality of separation platforms 2 and the plurality of adsorption mechanisms 4, it is able to separate the backlight sources of a plurality of display modules from corresponding display screens, so as to improve the separation efficiency and reduce the power consumption. In addition, since adjacent adsorption mechanisms 4 are fixedly connected to each other via the connection columns 5, all the adsorption mechanisms 4 may move simultaneously when the driving unit may drive drives one adsorption mechanism 4 to move, so as to simplify the structure and reduce the number of the driving units, thereby further reducing the power consumption.

In an optional embodiment of the present disclosure, as shown in FIG. 1, the driving unit includes at least two screw rods 6 arranged perpendicular to the machine table 1 and a motor (not shown) configured to drive the at least two screw rods 6 to rotate, and each adsorption mechanism 4 is in threaded connection with the at least two screw rods 6. One motor may be provided for each screw rod 6, and these motors may rotate simultaneously. Optionally, one motor may be provided for a plurality of screw rods 6, so as to reduce the power consumption.

In addition, the separation device further includes a programmable controller configured to control an output speed of the motor.

In another optional embodiment of the present disclosure, the driving unit includes at least one telescopic cylinder, a cylinder block of each telescopic cylinder is secured at a fixed position relative to the machine table 1, and one end of a telescopic rod of each telescopic cylinder is fixedly connected to one of the adsorption mechanisms 4. The telescopic movement of the telescopic cylinder drives the adsorption mechanism 4 to move. Of course, the cylinder block of the telescopic cylinder may be secured onto the machine table 1, and one end of the telescopic rod may be fixedly connected to the adsorption mechanism 4 closest to the machine table 1 so as to push the adsorption mechanism 4 from the bottom up. In addition, the cylinder block of the telescopic cylinder may be secured above the adsorption mechanism 4 farthest from the machine table 1 and one end of the telescopic rod may be fixedly connected to this adsorption mechanism 4, so as to pull the adsorption mechanism 4 from the bottom up. Each telescopic cylinder may be an air cylinder or oil cylinder.

Optionally, inside each separation platform 2 is provided with a heating unit configured to heat the display module placed on the separation platform 2, so as to reduce an adhesion force between the backlight source and the display screen, thereby facilitating the separation of the backlight source from the display screen. The heating unit may be a heating rod or a heating wire.

Figure 3:
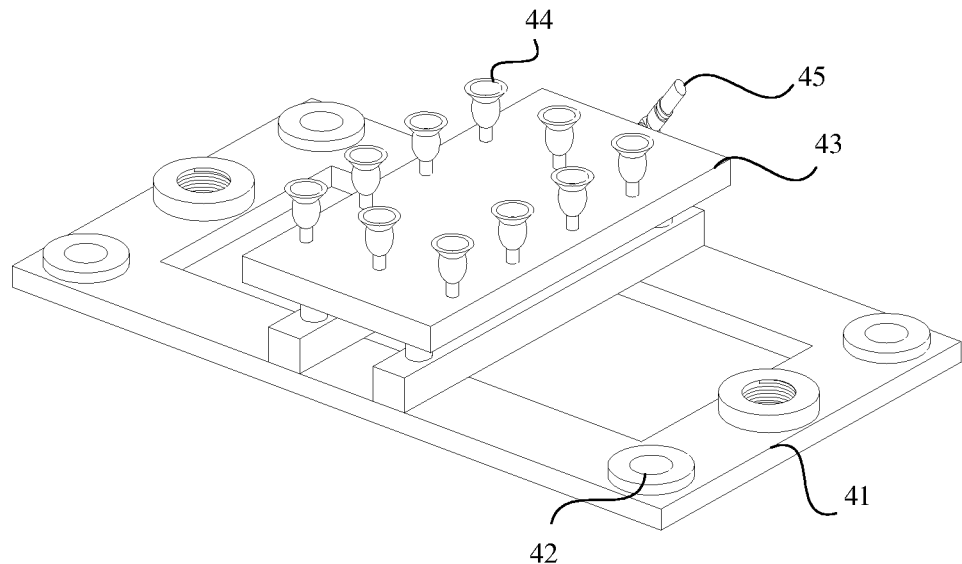
FIG. 3 is a schematic view showing a single adsorption mechanism according to some embodiments of the present disclosure.

The structure of each adsorption mechanism 4 may be set in accordance with the practical need. As shown in FIG. 3, each adsorption mechanism 4 includes: a frame 41 in which a plurality of guide holes 42 is arranged in one-to-one correspondence with the plurality of guide columns 3; and a support plate 43 arranged at a side of the frame 41 facing the machine table 1 and provided with a plurality of vacuum suction cups 44 and a vacuum pipeline 45 in communication with the vacuum suction cups 44. Each guide column 3 may be inserted into the corresponding guide hole 42, and a sliding bearing may be provided so as to slidably move the guide column 3 relative to the guide hole 42.

Figure 5:
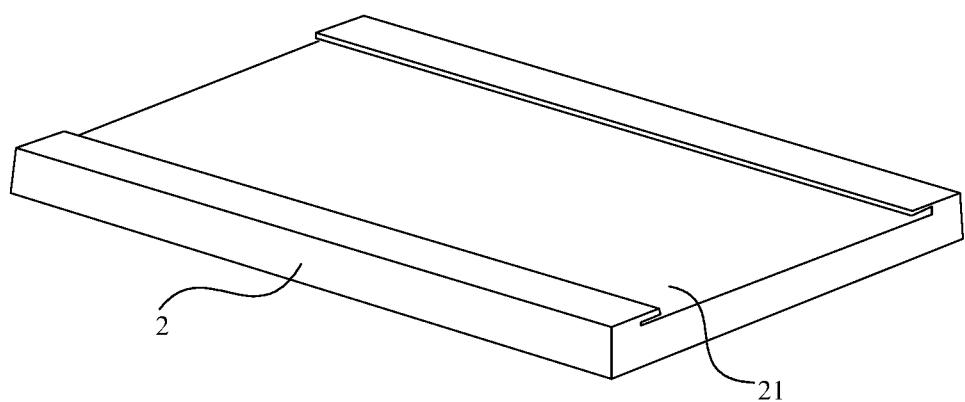
FIG. 5 is a schematic view showing a separation platform according to some embodiments of the present disclosure.

FIG. 5 is a schematic view showing a separation platform according to some embodiments of the present disclosure. Each separation platform 2 is provided with a T-shaped slot 21 for securing the backlight source. The T-shaped slot 21 is engaged with a lug of the backlight source, so as to secure the backlight source. Of course, the separation platform 2 may also be provided with any other structures for securing the backlight source, e.g., a vacuum adsorption disc, and those other structures are not enumerated herein.

The separation device for the backlight source in the present disclosure further includes a housing 7 configured to at least receive each separation platform 2, the plurality of guide columns 3 and each adsorption mechanism 4. Through the housing 7, it is able to prevent pollution by foreign matters when separating the backlight source from the display screen and improve the separation efficiency.

Obviously, a person skilled in the art may make further modifications and improvements without departing from the spirit of the present disclosure, and the present disclosure intends to include these modifications and improvements if they fall within the scope of the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A separation device for a backlight source, comprising:
    a machine table;
    a plurality of separation platforms, wherein each separation platform is located above the machine table and secured at a fixed position relative to the machine table, and is configured to support a display module and secure a backlight source of the display module thereon;
    a plurality of guide columns arranged perpendicular to the machine table;
    a plurality of adsorption mechanisms arranged in a one-to-one correspondence with the plurality of separation platforms, wherein each adsorption mechanism is arranged at a side of the corresponding separation platform away from the machine table and is configured to adsorb a display screen of the display module on the corresponding separation platform, an adsorption surface of each adsorption mechanism is parallel to a support surface of the corresponding separation platform, and each adsorption mechanism is movable in a lengthwise direction of the plurality of guide columns to adjust a distance from the adsorption surface of the each adsorption mechanism to the support surface of the corresponding separation platform;
    a driving unit configured to drive each adsorption mechanism to move in the lengthwise direction of the plurality of guide columns; and
    wherein the plurality of separation platforms is spaced from each other in the lengthwise direction of the plurality of guide columns, the plurality of separation platforms and the plurality of adsorption mechanisms are arranged alternately, and any two adjacent adsorption mechanisms are fixedly connected to each other via connection columns.

2. The separation device for the backlight source according to claim 1, wherein the driving unit comprises at least two screw rods arranged perpendicular to the machine table and a motor configured to drive the at least two screw rods to rotate, and each adsorption mechanism is in threaded connections with the at least two screw rods.

3. The separation device for the backlight source according to claim 2, further comprising:
    a programmable controller configured to control an output speed of the motor.

4. The separation device for the backlight source according to claim 1, wherein the driving unit comprises at least one telescopic cylinder, a cylinder block of each telescopic cylinder is secured at a fixed position relative to the machine table, and one end of a telescopic rod of each telescopic cylinder is fixedly connected to one of the plurality of adsorption mechanisms.

5. The separation device for the backlight source according to claim 4, wherein each telescopic cylinder is an air cylinder or oil cylinder.

6. The separation device for the backlight source according to claim 4, wherein the plurality of adsorption mechanisms includes an adsorption mechanism closest to the machine table and one end of the telescopic rod of each telescopic cylinder is fixedly connected to the adsorption mechanism closest to the machine table.

7. The separation device for the backlight source according to claim 4, wherein the plurality of adsorption mechanisms includes an adsorption mechanism farthest from the machine table and one end of the telescopic rod of each telescopic cylinder is fixedly connected to the adsorption mechanism farthest from the machine table.

8. The separation device for the backlight source according to claim 1, wherein a heating unit is provided inside each separation platform, to heat the display module placed on the each separation platform.

9. The separation device for the backlight source according to claim 1, wherein each adsorption mechanism comprises:
    a frame in which a plurality of guide holes is arranged in a one-to-one correspondence with the plurality of guide columns; and
    a support plate arranged at a side of the frame facing the machine table and provided with a plurality of vacuum suction cups and a vacuum pipeline in communication with the plurality of vacuum suction cups.

10. The separation device for the backlight source according to claim 9, wherein each separation platform is provided with a T-shaped slot for securing the corresponding backlight source.

11. The separation device for the backlight source according to claim 9, further comprising a housing configured to at least receive each separation platform, the plurality of guide columns and each adsorption mechanism.

12. The separation device for the backlight source according to claim 9, wherein each guide column is inserted into the corresponding guide hole, and a sliding bearing is arranged between the guide hole and the guide column so as to slidably move the guide column relative to the guide hole.

13. The separation device for the backlight source according to claim 1, wherein the plurality of separation platforms is arranged parallel to each other and parallel to the machine table.

14. A separation device for a backlight source, comprising:
    a machine table;
    at least one separation platform, wherein each separation platform is located above the machine table and secured at a fixed position relative to the machine table, and is configured to support a display module and secure a backlight source of the display module thereon;
    a plurality of guide columns arranged perpendicular to the machine table;
    at least one adsorption mechanism arranged in a one-to-one correspondence with the at least one separation platform, wherein each adsorption mechanism is arranged at a side of the corresponding separation platform away from the machine table and is configured to adsorb a display screen of the display module on the corresponding separation platform, an adsorption surface of each adsorption mechanism is parallel to a support surface of the corresponding separation platform, and each adsorption mechanism is movable in a lengthwise direction of the plurality of guide columns to adjust a distance from the adsorption surface of the each adsorption mechanism to the support surface of the corresponding separation platform;
    a driving unit configured to drive each adsorption mechanism to move in the lengthwise direction of the plurality of guide columns; and
    wherein each adsorption mechanism comprises:

a frame in which a plurality of guide holes is arranged in a one-to-one correspondence with the plurality of guide columns; and a support plate arranged at a side of the frame facing the machine table and provided with a plurality of vacuum suction cups and a vacuum pipeline in communication with the plurality of vacuum suction cups.

15. The separation device for the backlight source according to claim 14, wherein each separation platform is provided with a T-shaped slot for securing the corresponding backlight source.

16. The separation device for the backlight source according to claim 14, further comprising a housing configured to at least receive each separation platform, the plurality of guide columns and each adsorption mechanism.

17. The separation device for the backlight source according to claim 14, wherein each guide column is inserted into the corresponding guide hole, and a sliding bearing is arranged between the guide hole and the guide column so as to slidably move the guide column relative to the guide hole.

\* \* \* \* \*